(12) United States Patent
Benthien et al.

(10) Patent No.: US 12,535,096 B2
(45) Date of Patent: Jan. 27, 2026

(54) THREADED FASTENER FOR A FASTENING ELEMENT, FASTENING RAIL FOR AN AIRCRAFT CABIN, AND AIRCRAFT PROVIDED THEREWITH

(71) Applicant: Airbus Operations GmbH, Hamburg (DE)

(72) Inventors: Hermann Benthien, Hamburg (DE); Andreas Poppe, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 259 days.

(21) Appl. No.: 17/955,600

(22) Filed: Sep. 29, 2022

(65) Prior Publication Data

US 2023/0108292 A1  Apr. 6, 2023

(30) Foreign Application Priority Data

Oct. 4, 2021 (DE) .......................... 102021125716.6

(51) Int. Cl.
*F16B 39/02* (2006.01)
*B64C 1/18* (2006.01)

(52) U.S. Cl.
CPC ................ *F16B 39/02* (2013.01); *B64C 1/18* (2013.01)

(58) Field of Classification Search
CPC ...... F16B 39/02; F16B 39/04; F16B 37/0835; F16B 39/32; B64C 1/18; B64D 11/0696
USPC ....... 411/934, 209, 210, 211, 221, 315, 316, 411/317, 318, 190, 296, 298, 940, 941.1, 411/941.3, 945, 946
See application file for complete search history.

(56) References Cited

U.S. PATENT DOCUMENTS

| | | | | |
|---|---|---|---|---|
| 376,179 A | * | 1/1888 | Bowen | F16B 39/04 |
| | | | | 411/328 |
| 1,124,056 A | * | 1/1915 | Mullen | F16B 39/32 |
| | | | | 411/227 |
| 1,315,107 A | * | 9/1919 | Fitzpatrick | F16B 39/04 |
| | | | | 411/945 |

(Continued)

FOREIGN PATENT DOCUMENTS

| | | | |
|---|---|---|---|
| CN | 207018334 U | * | 2/2018 |
| CN | 110285133 A | * | 9/2019 |

(Continued)

OTHER PUBLICATIONS

German Search Report dated Mar. 12, 2022; priority document.

*Primary Examiner* — Kristina R Fulton
*Assistant Examiner* — Jock Wong
(74) *Attorney, Agent, or Firm* — Greer, Burns & Crain, Ltd.

(57) ABSTRACT

A blocking mechanism which is integrated with a threaded fastener is proposed for improving the reusability and handling of locking devices for threaded fasteners, such as threaded bolts or nuts. The blocking mechanism can be switched to and from between a blocked state, in which the threaded fastener is gripped in a positively locking manner, and an unblocked state, in which the threaded fastener can be rotated. The blocking mechanism can have a blocking element which can engage into a blocking groove of the threaded fastener in a positively locking manner in the blocked state, and thus prevents rotation. For example, a nut which is provided with the blocking mechanism can be used to pivotably fasten a fastening rod to a fastening rail.

14 Claims, 6 Drawing Sheets

(56) References Cited

U.S. PATENT DOCUMENTS

| | | | | |
|---|---|---|---|---|
| 3,827,110 | A | * 8/1974 | Dzus, Sr. | F16B 5/10 |
| | | | | 411/348 |
| 4,501,404 | A | * 2/1985 | Nelson | B64D 11/06 |
| | | | | 248/503.1 |
| 4,799,734 | A | 1/1989 | Periou | |
| 9,410,647 | B2 | 8/2016 | Steen et al. | |
| 10,378,198 | B2 | 8/2019 | Benthien et al. | |
| 2006/0038071 | A1* | 2/2006 | Schoene | B64D 11/0696 |
| | | | | 244/118.6 |
| 2009/0208309 | A1* | 8/2009 | Engelbrecht | F16B 41/005 |
| | | | | 29/505 |
| 2014/0131519 | A1* | 5/2014 | Benthien | B64C 1/18 |
| | | | | 411/366.1 |
| 2017/0321742 | A1* | 11/2017 | Tamer | F16B 39/10 |
| 2018/0194478 | A1* | 7/2018 | Carr | B64C 1/18 |

FOREIGN PATENT DOCUMENTS

| | | | | |
|---|---|---|---|---|
| CN | 110332203 | A * | 10/2019 | ............ F16B 35/041 |
| CN | 113446300 | A * | 9/2021 | |
| EP | 0265317 | A1 | 4/1988 | |
| EP | 3135833 | A1 | 3/2017 | |
| FR | 537014 | A * | 5/1922 | |
| FR | 2601731 | A1 * | 1/1988 | |
| KR | 20200111570 | A * | 9/2020 | |
| WO | WO-2011057337 | A1 * | 5/2011 | ............ B60B 23/06 |
| WO | 2014058967 | A2 | 4/2014 | |

\* cited by examiner

THREADED FASTENER FOR A FASTENING ELEMENT, FASTENING RAIL FOR AN AIRCRAFT CABIN, AND AIRCRAFT PROVIDED THEREWITH

CROSS-REFERENCES TO RELATED APPLICATIONS

This application claims the benefit of the German patent application No. 102021125716.6 filed on Oct. 4, 2021, the entire disclosures of which are incorporated herein by way of reference.

FIELD OF THE INVENTION

The invention relates to a threaded fastener for a fastening element, such as, for instance, a nut for a threaded bolt. Furthermore, the invention relates to a fastening rail for an aircraft cabin with a threaded fastener of this type, and to an aircraft.

BACKGROUND OF THE INVENTION

EP 3 135 833 A1 discloses a spherical joint connection with a ball-like bearing surface, on which a rod is mounted pivotably. The rod can be fixed by means of a nut in such a way that it is no longer pivotable.

SUMMARY OF THE INVENTION

It is an object of the invention to improve thread fasteners of this type, preferably with regard to their handling.

The invention provides a threaded fastener for a fastening element, the thread fastener comprising a threaded fastener body which comprises a thread for the fastening element, and on which a blocking mechanism is arranged or attached in an integrated manner, it being possible for the blocking mechanism to be switched between a blocked state and an unblocked state, the blocking mechanism being configured to block a relative rotation of the threaded fastener body relative to the fastening element by means of a blocking element in the blocked state, and to make a relative rotation of the threaded fastener body relative to the fastening element possible in the unblocked state.

It is preferred that the blocking element is configured to grip the fastening element in a positively locking manner for the purpose of blocking in the blocked state.

It is preferred that the blocking element projects, in the blocked state, from a circumferential wall section of the threaded fastener body in the direction of the fastening element in such a way that the blocking element grips the fastening element and, in the unblocked state, is arranged in the circumferential wall section in such a way that the relative rotation is made possible.

It is preferred that the blocking mechanism has an actuating element which, in the case of the change from the unblocked state into the blocked state, grips the blocking element and presses it along a radial direction of the threaded fastener body in such a way that the fastening element can be gripped in a positively locking manner; and the actuating element being configured to make a radial movement of the blocking element away from the fastening element possible in the unblocked state.

It is preferred that the actuating element carries out, during the change from the unblocked state into the blocked state, an axial movement along an axial direction of the threaded fastener body in addition to a radial displacement along the radial direction.

It is preferred that the blocking mechanism has an actuator which is coupled to the blocking element and can be moved relative to a circumferential wall portion of the threaded fastener body in such a way that the blocking mechanism can be transferred from the blocked state into the unblocked state or vice versa. It is preferred that the actuator can be displaced exclusively along an axial direction of the threaded fastener body.

It is preferred that the blocking mechanism has an elastic element which pushes the blocking mechanism in the direction of the blocked state. It is preferred that the elastic element is arranged between the actuator and a circumferential wall portion of the threaded fastener body.

It is preferred that the blocking mechanism is configured to be locked in the unblocked state.

It is preferred that the threaded fastener body is configured as a nut with an internal thread, it being possible for the fastening element to be screwed into the thread, or the threaded fastener body being configured as a threaded bolt with an external thread, it being possible for the fastening element to be screwed onto the thread.

It is preferred that the blocking mechanism has an operating element which is coupled operatively to the blocking element by means of at least one or precisely one further part, it being possible for the operating element to be moved along an axial direction of the threaded fastener body, in order to transfer the blocking mechanism from the blocked state into the unblocked state or vice versa.

The invention provides a fastener arrangement comprising an above-described threaded fastener and a fastening element which can be screwed to the threaded fastener body, the fastening element having a blocking groove which runs along an axial direction of the fastening element, the blocking element engaging in a positively locking manner into the blocking groove in the blocked state, and/or it being possible for the blocking element to be pushed out of the blocking groove in the unblocked state by way of relative rotation of the fastening element relative to the threaded fastener body, in order to make the relative rotation possible.

The invention provides a fastening rail for an aircraft cabin, the fastening rail comprising, on an upper side, a threaded bolt and a preferred threaded fastener which is adapted for the threaded bolt, in order to fix a fastening means on the threaded bolt releasably.

The fastening rail preferably has, furthermore, a supporting surface for a floor panel, onto which supporting surface the floor panel can be placed, the threaded fastener being configured in such a way that, when the threaded fastener is installed on it and is situated in the blocked state, upper end surfaces of the threaded fastener are arranged flush with or below a surface of the floor panel.

The invention provides a cabin floor region of an aircraft cabin of an aircraft, the cabin floor region comprising a preferred fastening and a fastening means for a cabin interior component, the fastening means being fixed on the fastening rail in the blocked state, and it being possible for it to be moved in at least one spatial direction with simultaneous tilting in the unblocked state.

The invention provides an aircraft comprising a preferred fastening rail and/or a preferred cabin floor region.

Threaded fasteners, such as nuts, are secured on fastening elements, such as threaded bolts, for example by means of a frictionally locking connection, lockwires, pins or deformed washers.

These types of securing means are as a rule mounted by means of tools and can be time-intensive or difficult to install. It is proposed to integrate a blocking mechanism into the threaded fastener, it additionally being possible for this blocking mechanism to be actuated without tools. A blocking element on the thread of the threaded fastener is used to block a relative rotation of the threaded fastener relative to the fastening element. Unlike conventional measures which blocked the longitudinal movement, the movement of the threaded fastener is therefore prevented directly.

BRIEF DESCRIPTION OF THE DRAWINGS

Exemplary embodiments of the invention will be explained in greater detail on the basis of the appended diagrammatic drawings, in which.

DETAILED DESCRIPTION OF THE PREFERRED EMBODIMENTS

Figure 1:
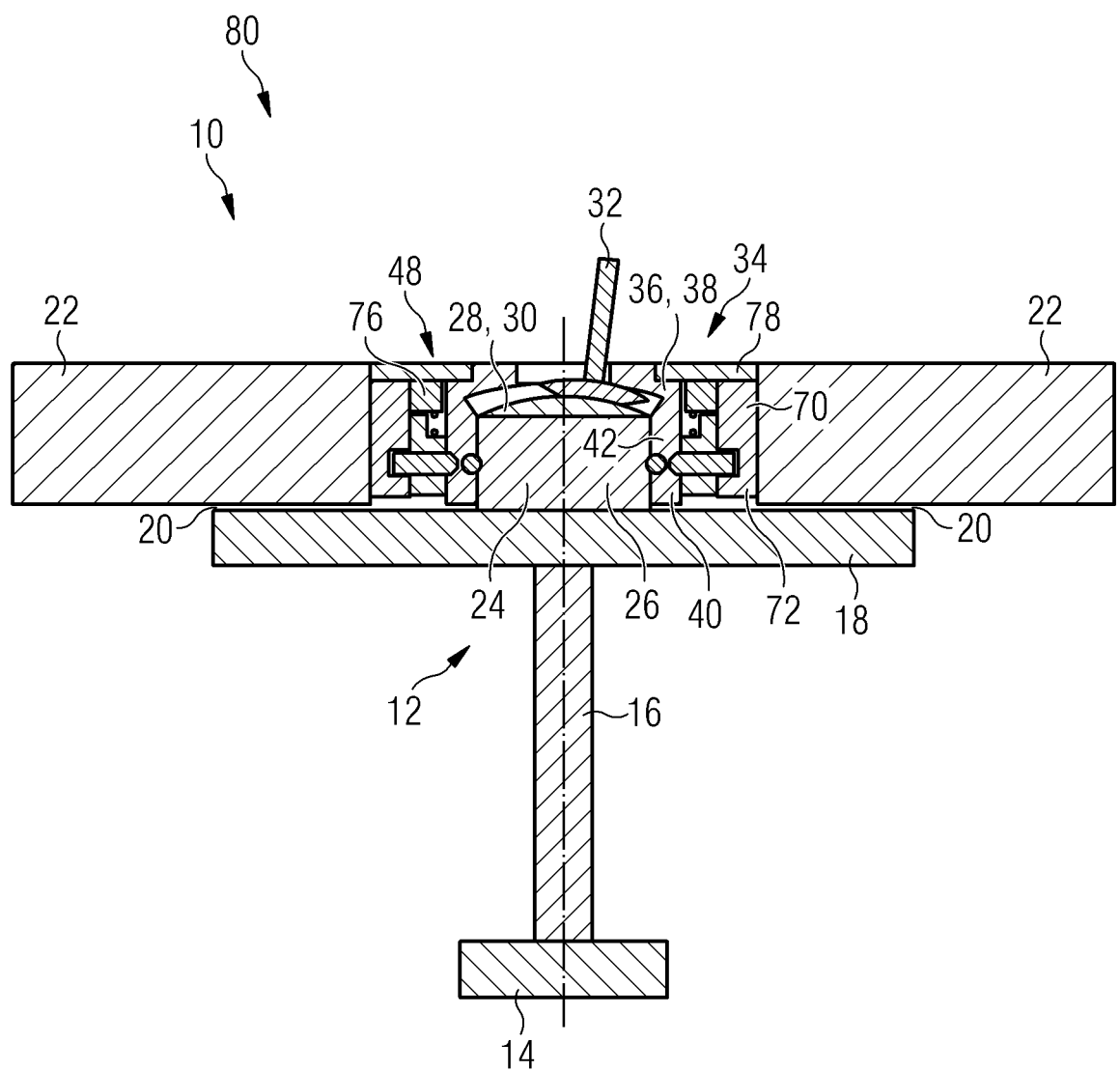
FIG. 1 shows a section through one example of a cabin floor region.

FIG. 1 shows a section through a cabin floor region 10 of an aircraft cabin of an aircraft. The cabin floor region 10 comprises a fastening rail 12. The fastening rail 12 is configured for fastening a cabin monument, passenger seat or other cabin interior component. The fastening rail 12 is configured as an I-beam in cross section. The fastening rail 12 comprises a base portion 14, a vertical portion 16 and a rail crown 18.

The rail crown 18 comprises supporting surfaces 20 for floor panel elements 22. The floor panel elements 22 form a cabin floor of the aircraft cabin.

The rail crown 18 comprises a threaded bolt 24 which is one example of a fastening element 26.

The threaded bolt 24 has an external thread 25 on its outer circumferential surface. Furthermore, the threaded bolt 24 comprises a spherical surface portion 28 which forms a bearing surface 30 for a fastening rod 32. The fastening rod 32 is adapted for fastening one of the abovementioned cabin interior components.

The threaded bolt 24, the bearing surface 30 and/or the fastening rod 32 can be configured as shown in EP 3 135 833 A1, for example in FIG. 2a, and explained in greater detail in paragraphs [0042] to [0049] therein, the disclosure thereof also being incorporated herein by way of reference.

Furthermore, the fastening rail 12 comprises a threaded fastener 34. The threaded fastener 34 can be released, in order to position the fastening rod 32, and can then be tightened, in order to block a movement of the fastening rod 32 relative to the fastening rail 12 or to the threaded bolt 24.

Figure 2:
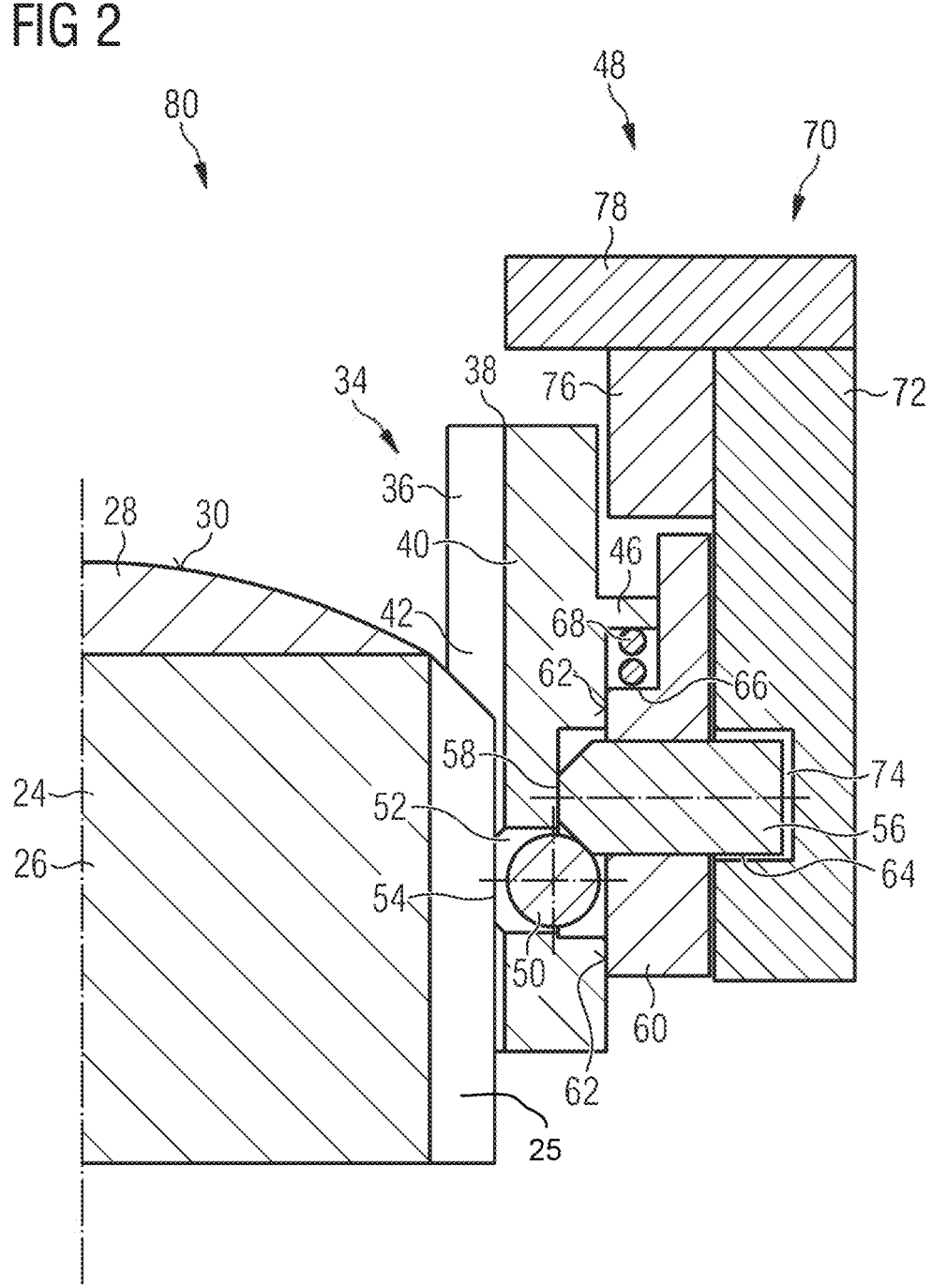
FIG. 2 shows a detailed view of one example of a fastening rail from FIG. 1.
Figure 3:
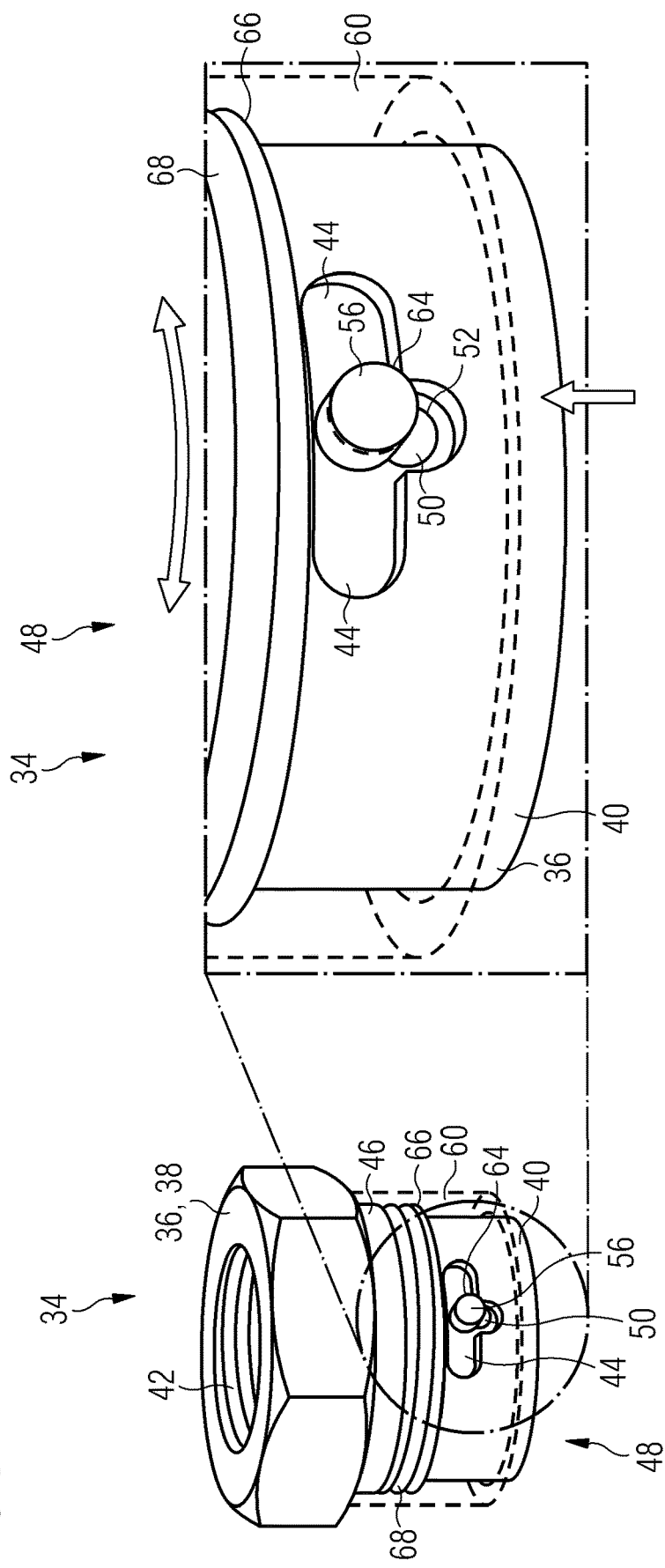
FIG. 3 shows a perspective view and a detailed view of one example of a threaded fastener.
Figure 4:
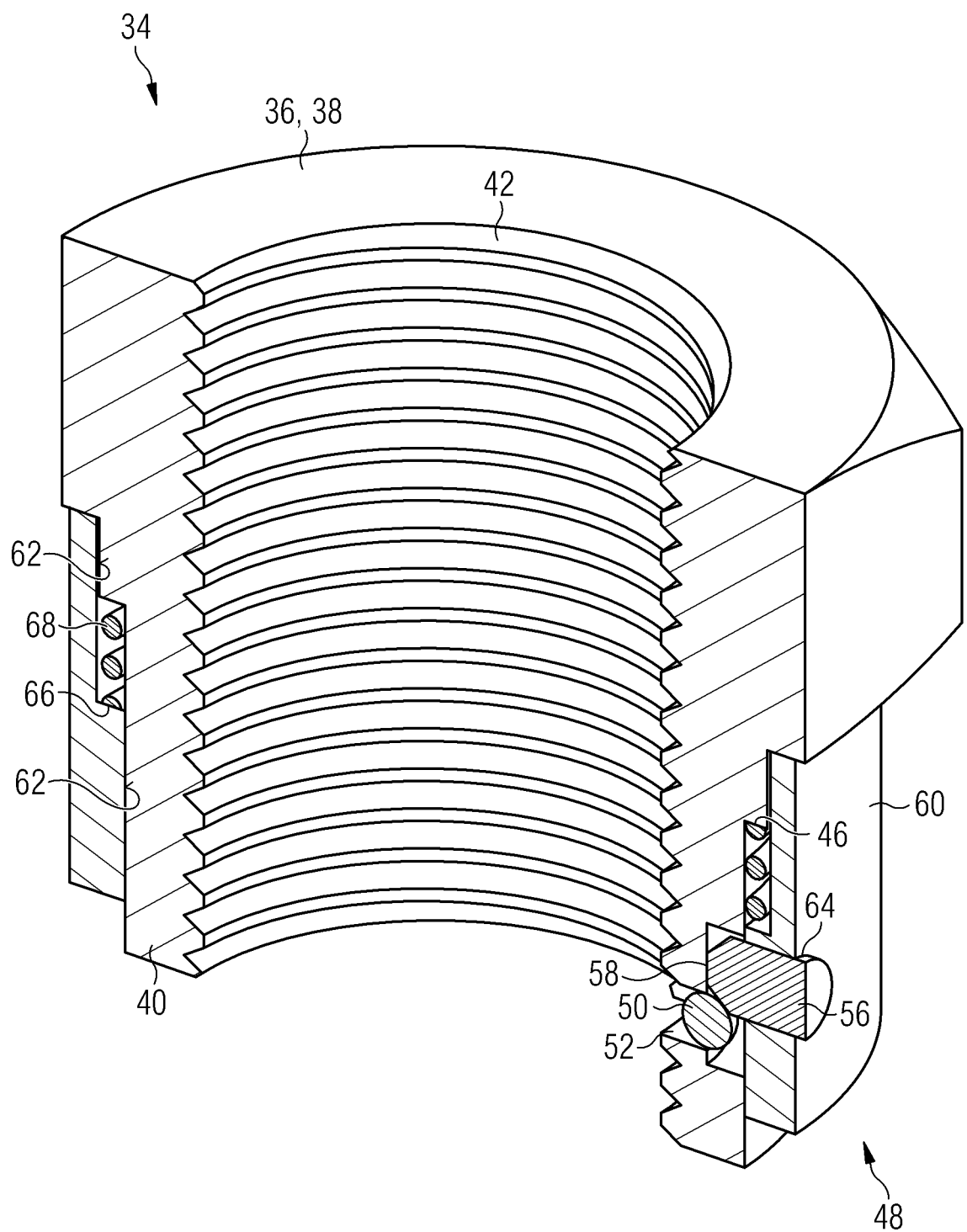
FIG. 4 shows a longitudinal section through the threaded fastener from FIG. 3.

The threaded fastener 34 will be explained in greater detail on the basis of FIG. 2 to FIG. 4. The threaded fastener 34 comprises a threaded fastener body 36. The threaded fastener body 36 is configured, for example, as a nut 38. The threaded fastener body 36 comprises a cylindrically shaped circumferential wall 40 which defines an opening for the threaded bolt 24. The threaded fastener body 36 has an internal thread 42 which is preferably configured on an inner circumferential surface of the circumferential wall 40.

The threaded fastener body 36 can comprise a locking groove 44 which is configured on an outer circumferential surface of the circumferential wall 40. As shown in FIG. 3, the locking groove 44 can be of substantially T-shaped configuration. It is also conceivable that the locking groove 44 is instead of substantially L-shaped configuration.

The threaded fastener body 36 can have a spring seat region 46 which is preferably configured on an outer circumferential surface of the circumferential wall 40. The spring seat region 46 can be configured in the form of a step which runs in the circumferential direction.

The threaded fastener 34 additionally comprises a blocking mechanism 48. The blocking mechanism 48 is configured in such a way that a relative rotation of the threaded fastener body 36 relative to the threaded bolt 24 can be blocked.

The blocking mechanism 48 is arranged on the threaded fastener body 36 in an integrated manner. In other words, in the case of use as intended of the threaded fastener 34, the blocking mechanism 48 cannot be released readily or preferably without a tool from the threaded fastener body 36.

The blocking mechanism 48 comprises a blocking element 50. The blocking element is configured, for example, as a blocking ball. The blocking element 50 can have any other suitable geometry, however, which can interact with the threaded bolt 24 in such a way that its relative rotation can be blocked.

The blocking mechanism 48 comprises a blocking opening 52. The blocking opening 52 is configured in the circumferential wall 40. The blocking opening 52 is designed in such a way that the blocking element 50 can protrude into the opening defined by the circumferential wall 40 and can possibly grip the threaded bolt 24 in a positively locking manner.

Furthermore, the blocking mechanism 48 comprises a blocking groove 54. The blocking groove 54 is configured on the threaded bolt 24. The blocking groove 54 runs along an axial direction of the threaded bolt 24 on its outer circumferential surface. The blocking groove 54 is designed in such a way that the blocking element 50 and the blocking groove 54 can grip one another.

The blocking mechanism 48 comprises an actuating element 56. The actuating element 56 is preferably configured as an actuating pin which has angled actuating surfaces 58. The actuating element 56 is mounted in such a way that it can carry out a sliding movement along the radial direction of the threaded fastener body 36. The actuating element 56 is arranged within the locking groove 44, in order for it to be possible to move along the circumferential direction in the region delimited by way of the locking groove 44.

Furthermore, the blocking mechanism 48 comprises an actuator 60. The actuator 60 is preferably configured as an actuating sleeve which is arranged along the circumferential wall 40. The actuator 60 is supported by way of sliding surfaces 62 which are configured on the outer circumferential surface of the circumferential wall 40. The actuator 60 comprises an actuating opening 64. The actuating opening 64 is designed in such a way that the actuating element 56 is supported therein such that it can be displaced in the radial direction. Furthermore, the actuator 60 comprises a second spring seat region 66. The actuator 60 is mounted on the threaded fastener body 36 in such a way that the actuator 60 can be displaced along the axial direction of the threaded fastener body 36.

The blocking mechanism 48 comprises an elastic element 68. The elastic element 68 is preferably configured as a spring. The elastic element 68 is arranged in such a way that the elastic element 68 grips the spring seat region 46 and the second spring seat region 66. The elastic element 68 pushes the actuator 60 in the direction of a blocked state.

The blocking mechanism 48 comprises an operating element 70. The operating element 70 is preferably designed in such a way that it fits seamlessly into its surroundings at a location of use. For example, the operating element 70 can be designed in such a way that it can form a continuous plane with the floor panel elements 22. The operating element 70 is of substantially cylindrical configuration, with the result that the operating element 70 can surround the actuating element 56 completely in the circumferential direction.

The operating element 70 can comprise a substantially cylindrical operating element body 72. An operating groove 74 can be configured on an inner circumferential surface of the operating element body 72. The operating groove 74 preferably extends along the circumferential direction of the operating element body 72 and on its inner circumferential surface.

The operating groove 74 can be designed in such a way that the actuating element is gripped in a positively locking manner along the axial direction of the threaded fastener body 36, whereas the actuating element 56 can be moved freely within the operating groove 74 along the circumferential direction of the threaded fastener body 36.

Furthermore, the operating element 70 preferably comprises a driver lug 76. The operating element 70 grips the actuating element 56 in a positively locking manner in its circumferential direction by means of the driver lug 76. In other words, the driver lug 76 is preferably designed in such a way that, in the case of a rotation of the operating element 70 relative to the threaded bolt 24, the actuator 60 and, as a result, the actuating element 56 can also be displaced along the circumferential direction.

Furthermore, the operating element 70 comprises a covering portion 78 which is arranged, for example, on the upper side of the operating element body 72. The covering portion 78 is designed in such a way that it is flush with the floor panel elements 22 in the blocked state.

In the following text, the method of operation of the threaded fastener 34 will be explained in greater detail on the basis of FIG. 5 and FIG. 6.

Figure 5:
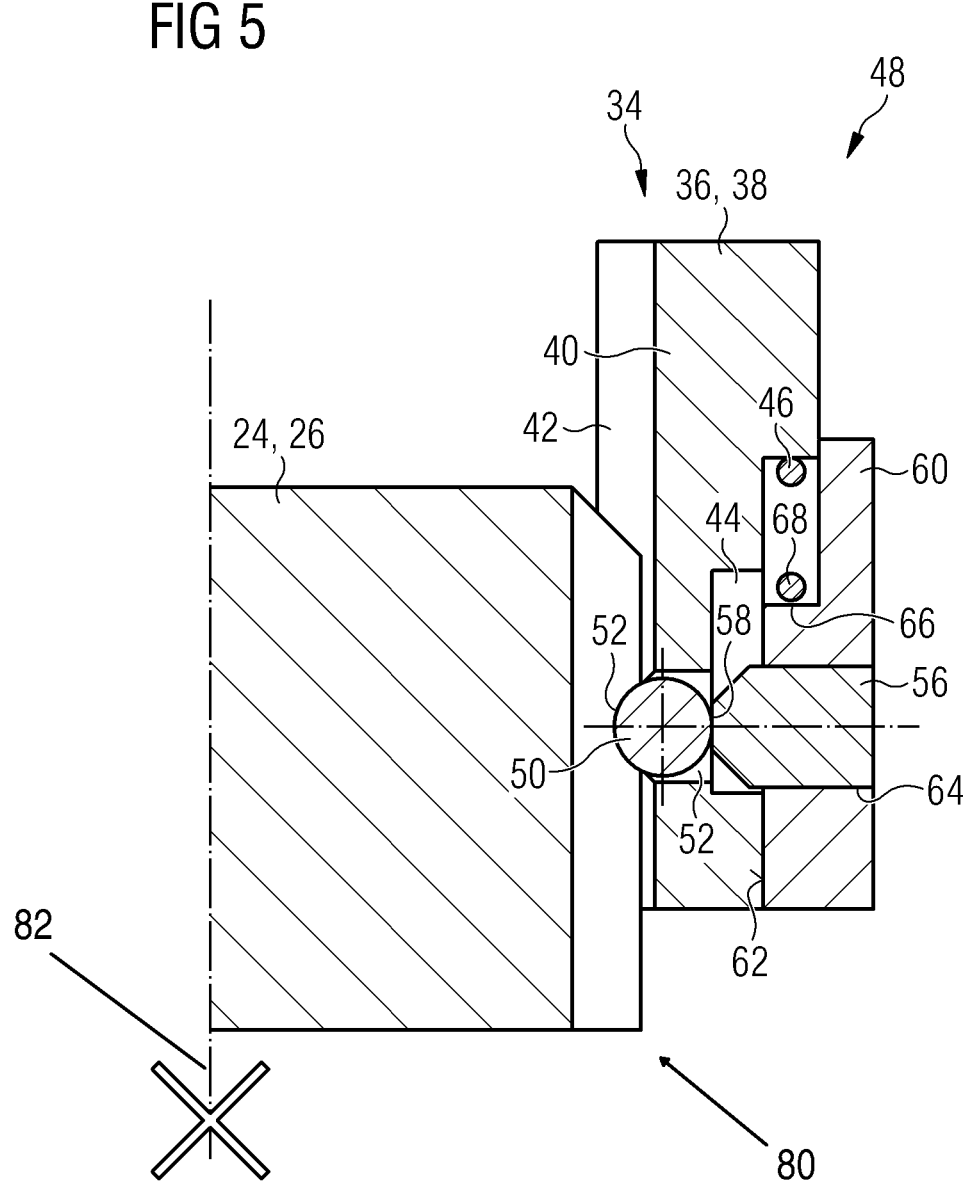
FIG. 5 shows an illustration of a fastener arrangement in the blocked state.

FIG. 5 shows a fastener arrangement 80, in the case of which the blocking mechanism 48 is in the blocked state. In the blocked state, a relative rotation between the threaded bolt 24 and the threaded fastener body 36 is blocked, as indicated by way of the cross on the rotational axis 82.

In the blocked state, the blocking element 50 engages through the blocking opening 52 into the blocking groove 54. The actuating element 56 supports the blocking element 50 in the radial direction, with the result that the blocking element 50 cannot be released from the blocking groove 54 even under an application of force.

The actuating element 56 can, for its part, be supported in the radial direction by way of the operating element 70, in order to prevent a movement of the actuating element 56 in the radial direction. The actuator 60 is arranged at the bottom in the vertical direction and is held in this position by the elastic element 68.

Figure 6:
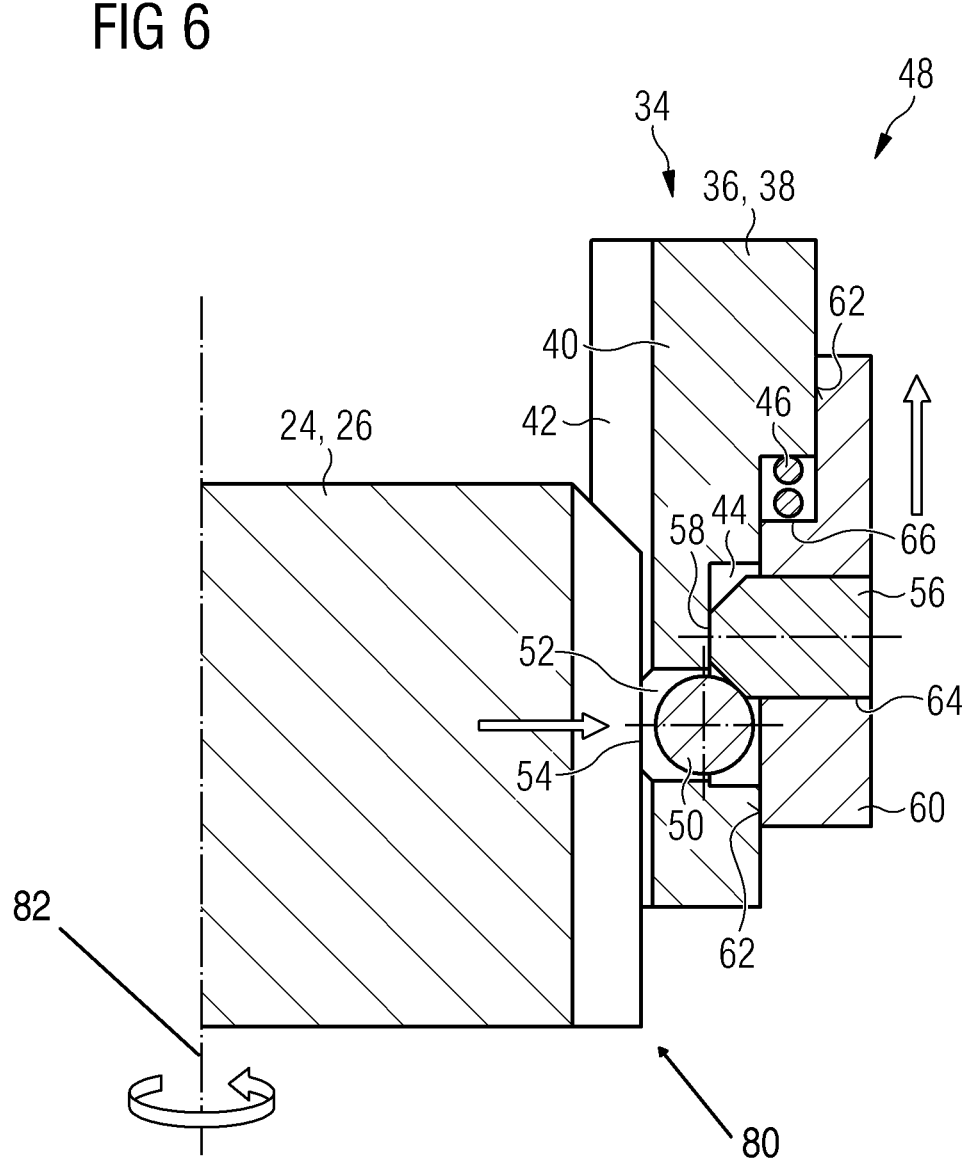
FIG. 6 shows an illustration of the fastener arrangement in the unblocked state.

In order to transfer the blocked state into the unblocked state, as is shown in FIG. 6 and is indicated by way of the arrow on the rotational axis 82, the operating element 70 is moved upwards along the axial direction. The operating element 70 is coupled directly to the actuating element 56 and likewise moves the latter with it upwards in the axial direction.

The actuator 60 is likewise moved upwards by the actuating element 56. Here, the elastic element 68 is compressed. It is already possible in this intermediate state for the blocking element 50 is to be moved out of the blocking groove 54. This can take place by way of a correspondingly angled surface at the blocking opening 52 and/or on the blocking groove 54. The blocking mechanism 48 is then situated in the unblocked state, as is shown in FIG. 6.

It is possible, furthermore, to lock the blocking mechanism 48. To this end, the operating element 70 is preferably rotated along the circumferential direction. The operating element 70 drives the actuator 60 with it in the circumferential direction by means of the driver lug 76. The actuating element 56 is for its part is driven in the circumferential direction by way of the actuator 60. The actuating element 56 is moved along those regions of the locking groove 44 which run in the circumferential direction.

If the operating element 70 is released, the elastic element 68 pushes the actuator 60 downwards in the axial direction. As a result, the actuating element 56 is pressed against the edge of the locking groove 44. The locking groove 44 blocks the further movement of the actuating element 56, with the result that the blocking mechanism 48 remains overall in the unblocked state.

In order to improve the reusability and handling of securing means for threaded fasteners 34, such as threaded bolts 24 or nuts 38, a blocking mechanism 48 which is integrated with the threaded fastener 34 is proposed. The blocking mechanism 48 can be switched to and fro between a blocked state, in which the threaded fastener 34 is gripped in a positively locking manner, and an unblocked state, in which the threaded fastener 34 can be rotated. The blocking mechanism 48 can have a blocking element 50 which, in the blocked state, can engage in a positively locking manner into a blocking groove 54 of the threaded fastener 34, and thus prevents a rotation. For example, a nut 38 which is provided with the blocking mechanism 48 can be used for pivotable fastening of a fastening rod 32 to a fastening rail 12.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS

10 Cabin floor region
12 Fastening rail
14 Base portion
16 Vertical portion
18 Rail crown
20 Supporting surface
22 Floor panel element 24 Threaded bolt
26 Fastening element
28 Spherical surface portion
30 Bearing surface
32 Fastening rod
34 Threaded fastener
36 Threaded fastener body
38 Nut
40 Circumferential wall
42 Internal thread
44 Locking groove
46 Spring seat region
48 Blocking mechanism
50 Blocking element
52 Blocking opening
54 Blocking groove
56 Actuating element
58 Actuating surface
60 Actuator
62 Sliding surfaces
64 Actuating opening
66 Second spring seat region
68 Elastic element
70 Operating element
72 Operating element body
74 Operating groove
76 Drive lug
78 Covering portion
80 Fastener arrangement
82 Rotational axis

The invention claimed is:

1. A threaded fastener for a fastening element, the threaded fastener comprising:
 a threaded fastener body which comprises:
  a thread for the fastening element, and
  a blocking mechanism is arranged on the threaded fastener body in an integrated manner, the blocking mechanism being configured to be switched between a blocked state and an unblocked state, the blocking mechanism being configured to block a relative rotation of the threaded fastener body relative to the fastening element by means of a blocking element in the blocked state, and to make the relative rotation of the threaded fastener body relative to the fastening element possible in the unblocked state,
 wherein the blocking mechanism comprises an actuating pin which, during a change from the unblocked state into the blocked state, is configured to grip the blocking element and press the blocking element along a radial direction of the threaded fastener body such that the fastening element is gripped in a positively locking manner, and further configured to make a radial movement of the blocking element away from the fastening element possible in the unblocked state,
 wherein during the change from the unblocked state into the blocked state, the actuating pin is configured to move with an axial movement along an axial direction of the threaded fastener body, and
 wherein during the change from the unblocked state into the blocked state, the actuating pin is further configured to move with a radial displacement along the radial direction.

2. The threaded fastener according to claim 1, the blocking element being configured to grip the fastening element in a positively locking manner for blocking in the blocked state.

3. The threaded fastener according to claim 1, the blocking element projecting, in the blocked state, from a circumferential wall section of the threaded fastener body in a direction of the fastening element such that the blocking element grips the fastening element and, in the unblocked state, being arranged in the circumferential wall section such that the relative rotation is made possible.

4. The threaded fastener according to claim 1, the blocking mechanism having an actuator which is coupled to the blocking element and is configured to be moved relative to a circumferential wall portion of the threaded fastener body such that the blocking mechanism can be transferred from the blocked state into the unblocked state or from the unblocked state into the blocked state.

5. The threaded fastener according to claim 1, the blocking mechanism having an elastic element which pushes the blocking mechanism in a direction of the blocked state.

6. The threaded fastener according to claim 1, the blocking mechanism being configured to be locked in the unblocked state.

7. The threaded fastener according to claim 1, the threaded fastener body being configured as a nut with an internal thread, the fastening element being configured to be screwed into the thread.

8. The threaded fastener according to claim 1, the blocking mechanism having an operating element which is coupled operatively to the blocking element with at least one or precisely one further part, the operating element being configured to be moved along an axial direction of the threaded fastener body, to transfer the blocking mechanism from the blocked state into the unblocked state or from the unblocked state into the blocked state.

9. A fastener arrangement comprising:
 a threaded fastener according to claim 1, and
 a fastening element configured to be screwed to the threaded fastener body, the fastening element having a blocking groove which runs along an axial direction of the fastening element, and at least one of
  the blocking element engaging in a positively locking manner into the blocking groove in the blocked state, or
  the blocking element being configured to be pushed out of the blocking groove in the unblocked state by way of relative rotation between the fastening element relative to the threaded fastener body,
 to make the relative rotation possible.

10. A fastening rail for an aircraft cabin, the fastening rail comprising:
 on an upper side, a threaded bolt, and
 a threaded fastener according to claim 1 which is configured to engage the threaded bolt, in order to fix a fastening means on the threaded bolt releasably.

11. The fastening rail according to claim 10 further comprising a supporting surface for a floor panel, onto which supporting surface the floor panel can be placed, the threaded fastener being configured such that, when the threaded fastener is installed on the floor panel and is situated in the blocked state, upper end surfaces of the threaded fastener are arranged flush with or below a surface of the floor panel.

12. A cabin floor region of an aircraft cabin of an aircraft, the cabin floor region comprising a fastening rail according to claim 10 and a fastening means for a cabin interior component, the fastening means being fixed on the fastening rail in the blocked state, and configured to be moved in at least one spatial direction with simultaneous tilting in the unblocked state.

13. An aircraft comprising a fastening rail according to claim 10.

14. An aircraft comprising a cabin floor region according to claim 12.

\* \* \* \* \*